US012107428B2

(12) United States Patent
Wang et al.

(10) Patent No.: US 12,107,428 B2
(45) Date of Patent: Oct. 1, 2024

(54) METHOD FOR SEAMLESS SWITCHING BETWEEN OFF-GRID AND GRID-CONNECTED AND HOUSEHOLD ENERGY STORAGE SYSTEM

(71) Applicant: FranklinWH Energy Storage Inc., San Jose, CA (US)

(72) Inventors: Daqing Wang, Shenzhen (CN); Song Chen, Shenzhen (CN); Gang Xiao, Shenzhen (CN)

(73) Assignee: Franklin WH Energy Storage Inc., San Jose, CA (US)

( * ) Notice: Subject to any disclaimer, the term of this patent is extended or adjusted under 35 U.S.C. 154(b) by 0 days.

(21) Appl. No.: 18/350,965

(22) Filed: Jul. 12, 2023

(65) Prior Publication Data

US 2023/0402852 A1 Dec. 14, 2023

Related U.S. Application Data

(63) Continuation of application No. PCT/CN2022/098163, filed on Jun. 10, 2022.

(51) Int. Cl.
*H02J 3/38* (2006.01)
(52) U.S. Cl.
CPC .............. *H02J 3/388* (2020.01); *H02J 3/381* (2013.01); *H02J 2203/20* (2020.01)

(58) Field of Classification Search
CPC .... H02J 3/388; H02J 3/381; H02J 3/38; H02J 2203/20
See application file for complete search history.

(56) References Cited

U.S. PATENT DOCUMENTS

2020/0336003 A1* 10/2020 Narla ...................... H02J 7/007

FOREIGN PATENT DOCUMENTS

CN 110165701 A 8/2019

* cited by examiner

*Primary Examiner* — Robert L Deberadinis
(74) *Attorney, Agent, or Firm* — ANOVA LAW GROUP, PLLC (57) ABSTRACT

The present application relates to a method for seamless switching between off-grid and grid-connected including: in a grid-connected state, when a host determines that utility power is abnormal, a grid-connected working mode is closed, a phase-locked source of the host is switched from the utility power to a self-oscillation state, the phase-locked source of the slave is switched to the self-oscillation state of the host, and phase-locking is performed, and an off-grid working mode is started after an input switch is turned off; in an off-grid state, when the host determines that the utility power is normal, the phase-locked source of the host is switched from the self-oscillation state to the utility power, and, the phase-locked source of the slave is switched to the utility power, and phase-locking is performed, and the grid-connected working mode is started after the input switch is turned on.

17 Claims, 8 Drawing Sheets

METHOD FOR SEAMLESS SWITCHING BETWEEN OFF-GRID AND GRID-CONNECTED AND HOUSEHOLD ENERGY STORAGE SYSTEM

CROSS-REFERENCE TO RELATED APPLICATIONS

This application is a continuation application of International Patent Application number PCT/CN2022/098163, filed on Jun. 10, 2022, the content of which is incorporated herein by reference in its entirety.

TECHNICAL FIELD

The present application relates to the technical field of household energy storage, and in particular, a method for seamless switching between off-grid and grid-connected and a household energy storage system.

BACKGROUND

The utility power can supply power to all production sites. However, there are power failures in the utility power grid for reasons like transformer damage or line maintenance, which brings inconvenience to people's work and life. A continuous and uninterrupted power supply is usually required in occasions such as data centers, large enterprises, hotels, and banks. On these occasions, backup power generation equipment or a household energy storage system is usually available. When a power failure is detected, the power generation equipment or the household energy storage system is required to automatically start the power supply. After the utility power is restored, the generator set is required to be connected to the utility power grid before being shut down. In this manner, inconvenience caused by power failures again to production and life is avoided during the switching process.

However, usually, the household energy storage system is automatically started after a power failure is detected, resulting in an interruption of power supply.

SUMMARY

Embodiments of the present application provide a method for seamless switching between off-grid and grid-connected and a household energy storage system, ensuring the seamless switching between off-grid and grid-connected when utility power fails.

To solve the preceding problems, embodiments of the present application provide a method for seamless between switching off-grid and grid-connected. The method includes the steps described below.

In a grid-connected state, when a host determines that utility power is abnormal, a grid-connected working mode is closed. A phase-locked source of the host is switched from the utility power to a self-oscillation state. The host notifies a slave to switch a phase-locked source and sends a phase-locked result to the slave. The phase-locked source of the slave is switched to the self-oscillation state of the host, and phase-locking is performed. An input switch of the utility power is turned off when the phase-locking of the slave ends. An off-grid working mode is started after the input switch is turned off.

In an off-grid state, when the host determines that the utility power is normal, the phase-locked source of the host is switched from the self-oscillation state to the utility power. The host notifies the slave to switch a phase-locked source and sends a phase-locked result to the slave. The phase-locked source of the slave is switched to the utility power, and phase-locking is performed. The input switch of the utility power is turned on after the phase-locking of the slave ends. The off-grid working mode is closed before the input switch is turned on, and the grid-connected working mode is started after the input switch is turned on.

To solve the preceding problems, embodiments of the present application provide a household energy storage system, including an energy management module, an energy gateway, an intelligent power distribution module, and at least one energy storage subsystem.

The energy management module includes an energy management unit and a communication gateway. The energy management unit is configured to control charging and discharging of the energy storage subsystem. The communication gateway is configured to detect an operating state of the entire household energy storage system and communicate with an Internet of Things cloud platform.

The energy gateway is configured to cut off connection between utility power and the household energy storage system when the utility power fails, and is configured to resume the connection between the utility power and the household energy storage system when the utility power is restored.

The intelligent power distribution module is configured to control on-off of the energy storage subsystem and control an access of loads and an access of power supply equipment.

The energy storage subsystem includes a battery management module, an energy storage battery module, and at least one power converter. The battery management module is configured to manage charging and discharging of the energy storage battery module and acquire a signal of the energy storage battery module. The power converter is configured to convert an alternating current into a direct current rechargeable for the energy storage battery module, and when the energy storage battery module discharges, the power converter is configured to convert a direct current into an alternating current usable by grid-connected and home loads.

In a grid-connected state, when the energy management module determines that the utility power is abnormal, a grid-connected working mode is closed. A phase-locked source of the energy management module is switched from the utility power to a self-oscillation state. The energy management module notifies the power converter to switch a phase-locked source and sends a phase-locked result to the power converter. The phase-locked source of the power converter is switched to the self-oscillation state of the energy management module, and phase-locking is performed. An input switch of the utility power is turned off when the phase-locking of the power converter ends. An off-grid working mode is started after the input switch is turned off.

In an off-grid state, when the energy management module determines that the utility power is normal, the phase-locked source of the energy management module is switched from the self-oscillation state to the utility power. The energy management module notifies the power converter to switch a phase-locked source and sends a phase-locked result to the power converter. The phase-locked source of the power converter is switched to the utility power, and phase-locking is performed. The input switch of the utility power is turned on after the phase-locking of the power converter ends. The off-grid working mode is closed before the input switch is turned on, and the grid-connected working mode is started after the input switch is turned on.

Embodiments of the present application provide a method for seamless switching between off-grid and grid-connected and a household energy storage system. Through the switching of the phase-locked sources between the host and the slave when the utility power is abnormal, the seamless switching between off-grid and grid-connected is achieved.

BRIEF DESCRIPTION OF DRAWINGS

To illustrate technical solutions in embodiments of the present application more clearly, the drawings used in description of the embodiments are described hereinafter. Apparently, the drawings described hereinafter illustrate part of embodiments of the present application, and those skilled in the art may obtain other drawings based on the drawings described hereinafter on the premise that no creative work is done.

DETAILED DESCRIPTION

Unless otherwise defined, all technical and scientific terms used herein have the same meanings as those commonly understood by those skilled in the art to which the present application pertains. The terms used in the specification of the present application are only used for describing specific embodiments and not intended to limit the present application. The terms "comprising", "including" or any other variations thereof described in the Description, Claims, and Drawings of the present application are intended to encompass a non-exclusive inclusion. The terms "first", "second" and the like in the Description, Claims, and preceding Drawings of the present application are configured to distinguish different objects and are not configured to describe a particular order.

"Embodiment" mentioned throughout the present application means that a particular feature, structure, or characteristic described in the embodiments is included in at least one embodiment of the present application. This phrase occurred in various locations in the specification is not necessary to refer to the same embodiment, nor is an independent or alternative embodiment that is mutually exclusive from other embodiments. It is explicitly and implicitly appreciated by those skilled in the art that embodiments described herein may be combined with other embodiments.

The technical solutions in embodiments of the present application are described clearly and completely in connection with the drawings in the embodiments of the present application. Apparently, the embodiments described below are part, not all, of the embodiments of the present application. Based on the embodiments of the present application, all other embodiments obtained by those of ordinary skill in the art without creative work are within the scope of the present application.

Figure 1:
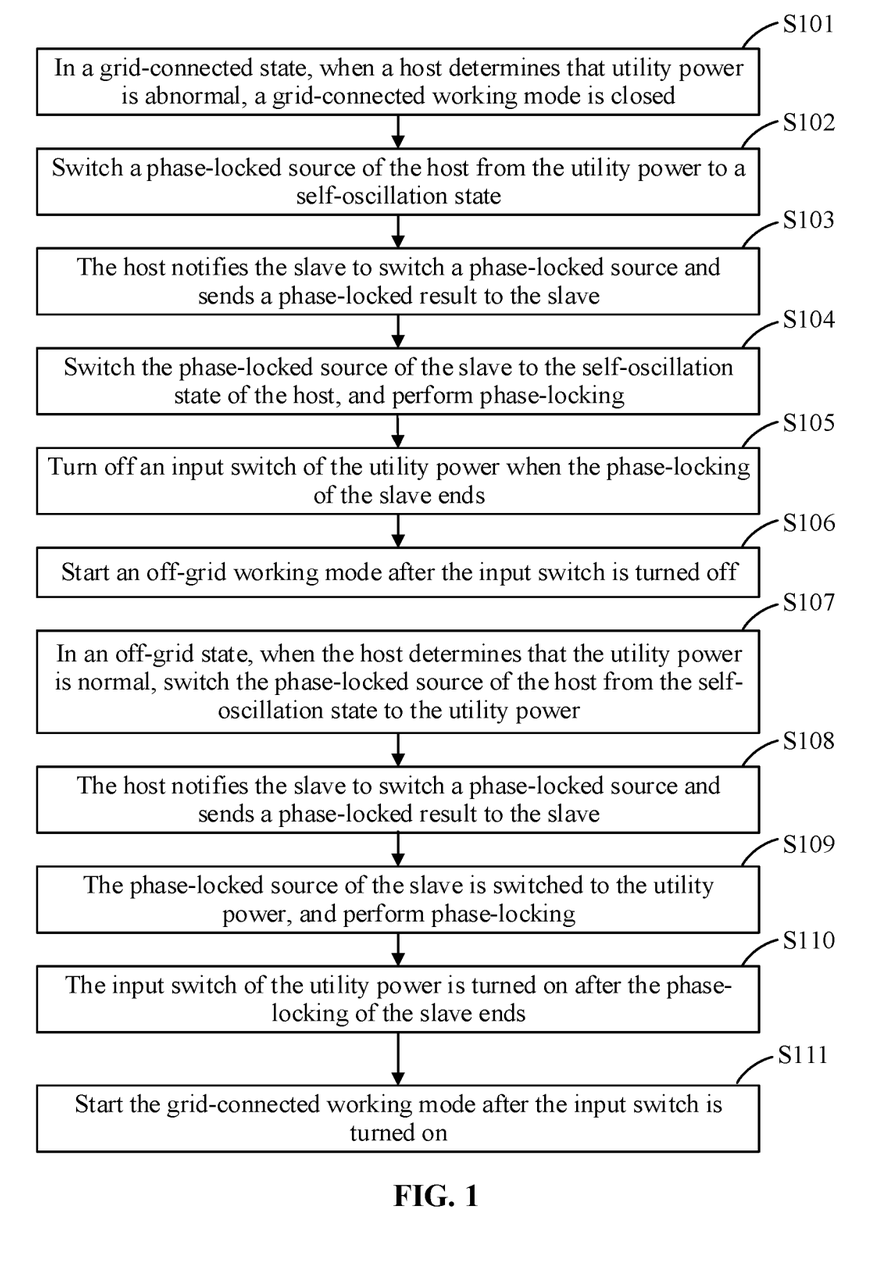
FIG. 1 is a flowchart of an embodiment of a method for seamless switching between off-grid and grid-connected according to the present application.

FIG. 1 shows a method for seamless switching between off-grid and grid-connected according to embodiments of the present application. With reference to FIG. 1, the method is implemented in a hardware environment of a household energy storage system configured with a computer that stores and executes computer instructions. The hardware of the computer includes, but is not limited to, a microprocessor, an Application SPCScific Integrated Circuit (ASIC), a Field-Programmable Gate Array (FPGA), a Digital Signal Processor (DSP), and an embedded device. The forms of the computer are not limited to a desktop computer, a notebook, a palmtop computer, and a cloud server.

S101: In a grid-connected state, when a host determines that utility power is abnormal, a grid-connected working mode is closed.

Utility power, that is, power frequency alternating current (AC), is characterized by three commonly used quantities of alternating current, namely, voltage, current, and frequency. Commonly used AC power frequencies are 50 Hz and 60 Hz in various countries in the world. The civilian AC voltage ranges from 100 V to 380 V. The utility power of the three-phase 380 V, 50 HZ is generally introduced by the computer room as the power supply. However, the power supply rectifier module of the equipment uses a single-phase 220V.

The grid-connected working mode refers to a completely self-power mode (anti-backflow), a self-power residual grid-connected mode, and a full amount grid-connected mode.

Specifically, in the grid-connected state, the host detects whether the utility power is normal, and closes the grid-connected working mode when the detection result shows that the utility power is abnormal.

It is easy to understand that when the utility power frequency is 50 Hz and the phase difference is $\pi/2$, the time difference is 4 ms. To ensure that the abnormality of the utility power is captured in the shortest time, in an embodiment, the time interval of abnormality detection is 4 ms.

S102: A phase-locked source of the host is switched from the utility power to a self-oscillation state.

The phase-locked source refers to a phase-locked frequency source. The phase-lock is a technology that makes the phase of the controlled oscillator controlled by a standard signal or an external signal. The phase-lock is used to achieve phase synchronization with the external signal or track the frequency or phase of the external signal. Phase-lock is an abbreviation for phase lock, indicating the phase synchronization between two signals.

The self-oscillation state refers to a self-sustained oscillation state. The self-sustained oscillation is a stable periodic motion with a fixed frequency and amplitude generated in the system in the absence of the external periodic change signal.

Specifically, in the grid-connected state, when the utility power is normal, the host uses the utility power as a phase-locked source for phase-locking processing and sends the phase-locked result to the slave. In this manner, the slave performs compensation based on the phase-locked result of the host and keeps in sync with the phase of the utility power.

S103: The host notifies the slave to switch a phase-locked source and sends a phase-locked result to the slave.

After switching the phase-locked source from the utility power to the self-oscillation state, the host notifies the slave to switch a phase-locked source and sends a phase-locked result to the slave.

The notification method may specifically be wired communication or wireless communication. Preferably, when the notification method is wireless communication, the phase-locked result is interactively delivered by mail.

S104: The phase-locked source of the slave is switched to the self-oscillation state of the host, and phase-locking is performed.

After receiving the phase-locked result, the slave switches to the self-oscillation state of the host and performs phase-locking according to the parameters in the phase-locked result.

The parameters in the phase-locked result are used for phase adjustment, specifically including but not limited to the value of the host carrier counter and the phase value after the host successfully performs the phase-locking.

S105: An input switch of the utility power is turned off when the phase-locking of the slave ends.

When the phase-locking of the slave ends, the input switch of the utility power is turned off.

It should be understood that in this embodiment, the input switch of the utility power refers to a switch for controlling the connection of the utility power and may specifically be an electrical component such as a relay. In a specific embodiment, when the host determines that the utility power is abnormal, the grid-connected working mode is closed, and the relay drive is started to execute the disconnection command of the relay.

It should be noted that the disconnection of the input switch of the utility power in this embodiment is the time point of actual disconnection. The input switch of the utility power, from the execution of the disconnection command to the actual disconnection, consumes the same time as the off-grid phase-locking, which is an oscillation cycle of the utility power. For example, when the utility power is 50 Hz, the off-grid phase-locking time is 20 ms.

Figure 2:
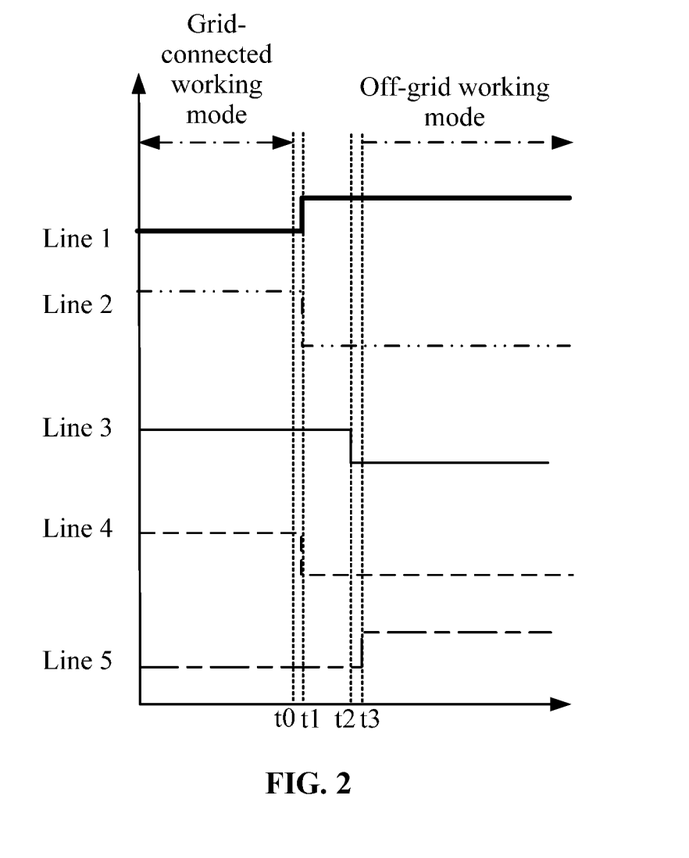
FIG. 2 is a timing diagram where grid-connected is switched to off-grid of an embodiment of a method for seamless switching between off-grid and grid-connected according to the present application.

FIG. 2 is a specific timing diagram where grid-connected is switched to off-grid in this embodiment. With reference to FIG. 2, the host detects a failure in the grid of the utility power within 4 ms, and then the host and the slave coordinate to enter the off-grid phase-locking process. Meanwhile, the relay drive receives the host's disconnection command to disconnect the grid-side relay (an input switch of the utility power). The off-grid phase-locking process and the duration of the disconnection are both 20 ms (one cycle of the utility power). After the grid-side relay is disconnected, the off-grid drive (a drive working in an off-grid state) is started with a delay of 1.5 ms and the off-grid working mode is entered. Line 1 is the timing change process of grid failure. Line 2 is the timing change process of grid-side relay drive signal. Line 3 is the change process of grid-side relay. Line 4 is the action change process of grid-connected drive. Line 5 is the timing change process of the off-grid drive. The host periodically detects the utility power. A detection cycle starts from t0 to t1. At t1, it is confirmed that a failure exists in the utility power, and the curve of line 1 is abnormal from normal operation. Meanwhile, a drive signal for the relay to be disconnected is generated to drive the relay to be disconnected. From t1 to t2, the relay performs the disconnection. Meanwhile, the grid-connected drive is disconnected, and the off-grid drive starts to perform off-grid phase-locking. At t2, the relay completes the disconnection and continues to delay a time of (t3−t2). When t3 is reached, the host-slave phase synchronization is completed, and the off-grid drive is turned on to enter the off-grid mode.

S106: An off-grid working mode is started after the input switch is turned off.

It should be noted that the process from S102 to S104 is off-grid phase-locking. When the utility power is detected to be abnormal, disconnection of the utility power switch is executed. When the utility power switch is turned off, the host and the slave perform off-grid phase-locking. In this manner, the uninterrupted power supply is ensured when grid-connected is switched to off-grid. After the utility power switch is turned off, the off-grid phase-locking process is delayed until the off-grid mode is successfully started.

In this embodiment, the off-grid drive is adopted to activate the off-grid algorithm and enter the off-grid working mode.

S107: In an off-grid state, when the host determines that the utility power is normal, the phase-locked source of the host is switched from the self-oscillation state to the utility power.

In the off-grid state, the host monitors the voltage/frequency of the utility power and determines whether the utility power is restored to normal according to the monitored result. After confirming that the utility power is normal, the host switches the phase-locked source from the self-oscillation state to the utility power.

S108: The host notifies the slave to switch a phase-locked source and sends a phase-locked result to the slave.

After switching the phase-locked source to the utility power, the host notifies the slave to switch the phase-locked source and sends the phase-locked result to the slave.

S109: The phase-locked source of the slave is switched to the utility power, and phase-locking is performed.

After receiving the notification from the host, the slave switches the phase-locked source based on the phase-locked result of the host, thereby achieving phase synchronization with the utility power.

S110: The input switch of the utility power is turned on after the phase-locking of the slave ends.

After successfully performing phase-locking, the slave sends the phase-locked result to the host. After receiving the command of successful phase-locking from the slave, the host executes the command of turning on the input switch of the utility power to connect to the power grid of the utility power.

S111: The grid-connected working mode is started after the input switch is turned on.

After the input switch is turned on, the grid-connected working mode is started.

It should be noted that to ensure a seamless connection during the switching process, the power conversion algorithm of the off-grid drive is switched from the off-grid algorithm to the grid-connected algorithm at a preset time before the input switch is actually turned on, and after the preset time when the input switch is actually turned on, the grid-connected drive (a drive working in the grid-connected state) is started, and the grid-connected working mode is entered.

Figure 3:
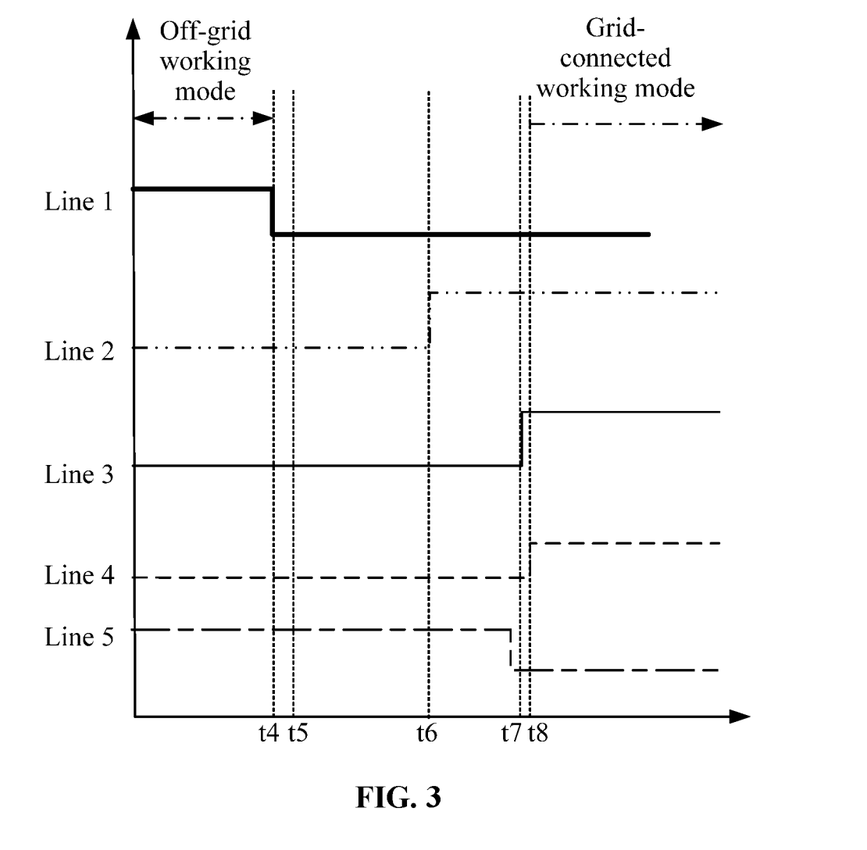
FIG. 3 is a timing diagram where off-grid is switched to grid-connected of an embodiment of a method for seamless switching between off-grid and grid-connected according to the present application.

FIG. 3 is a specific timing diagram where off-grid is switched to grid-connected in this embodiment. With reference to FIG. 3, the host detects that the utility power is restored to normal within 4 ms, and then the host and the slave coordinate to enter the grid-connected phase-locking process. Meanwhile, the relay drive receives the host's pull-in command and begins to turn on the grid-side relay (the input switch of the utility power). The grid-connected phase-locking process and the duration of the pull-in are both 20 ms (one cycle of the utility power). After the grid-side relay is pulled in, the grid-connected drive is started with a delay of 1.5 ms and the grid-connected working mode is entered. Line 1 is the timing change process of grid failure. Line 2 is the timing change process of grid-side relay drive signal. Line 3 is the change process of grid-side relay. Line 4 is the action change process of grid-connected drive. Line 5 is the timing change process of the off-grid drive. The host periodically detects the utility power. A detection cycle starts from t4 to t5. At t5, it is confirmed that the utility power is restored to normal and the curve of line 1 changes from an abnormal state to a normal state. Meanwhile, the host and the slave start to perform phase-locking with the utility power as the phase-locking source. At t6, the phase-locking is completed, and the drive signal for the pull-in of the relay is generated to drive the relay to perform the pull-in operation. At t7, the relay completes the pull-in operation, the off-grid drive is turned off, and time is delayed (t8−t7) to reach t8. At this time, the grid-connected drive is turned on to enter the grid-connected mode.

Embodiments of the present application provide a method for seamless switching between off-grid and grid-connected and a household energy storage system. Through the switching between the phase-locked sources of the host and slave when the utility power is abnormal, the seamless switching between off-grid and grid-connected is achieved, and electricity safety and user experience are improved.

It should be noted that the execution order of S101 to S111 can be adjusted adaptively according to actual requirements, and embodiments of the present application provide one of the execution orders.

Figure 4:
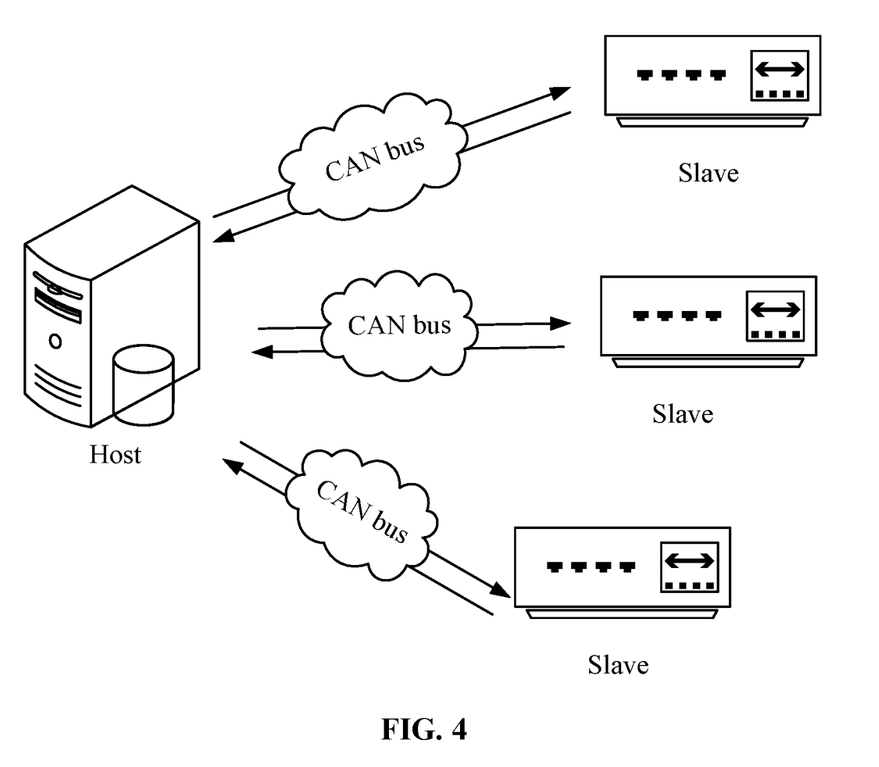
FIG. 4 is a diagram of CAN communication of an embodiment of a method for seamless switching between off-grid and grid-connected according to the present application.

In some optional implementations of this embodiment, the host phase-locks phase and frequency of the utility power. The host communicates with the slave via CAN bus. Specifically, as shown in FIG. 4, the host synchronously communicates with multiple slaves via the CAN bus. CAN, an abbreviation of Controller Area Network (hereinafter referred to as CAN), is an ISO international standardized serial communication protocol.

Figure 5:
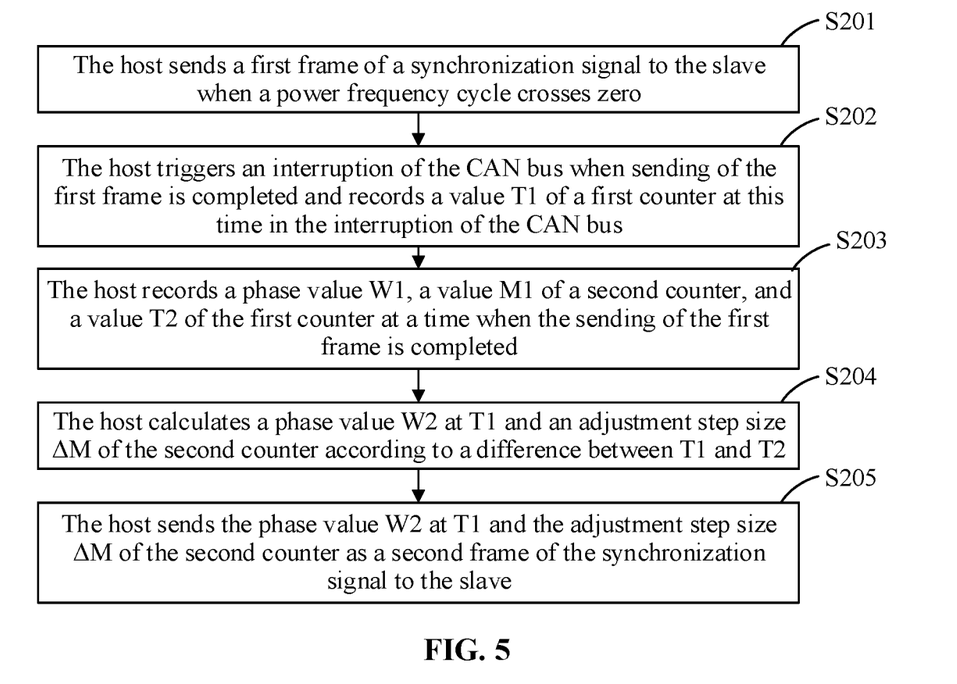
FIG. 5 is another flowchart of an embodiment of a seamless switching method for off-grid and grid-connected according to the present application.

As shown in FIG. 5, some optional implementations mainly include the steps described below.

S201: The host sends a first frame of a synchronization signal to the slave when a power frequency cycle crosses zero.

S202: The host triggers an interruption of the CAN bus when sending of the first frame is completed and records a value T1 of a first counter at this time in the interruption of the CAN bus.

S203: The host records a phase value W1, a value M1 of a second counter, and a value T2 of the first counter at a time when the sending of the first frame is completed.

S204: The host calculates a phase value W2 at T1 and an adjustment step size ΔM of the second counter according to a difference between T1 and T2.

S205: The host sends the phase value W2 at T1 and the adjustment step size ΔM of the second counter as a second frame of the synchronization signal to the slave.

When the utility power is normal, the power supply system is in the grid-connected working mode. At this time, the host phase-locks the phase and frequency of the utility power and interacts with the slave based on the CAN bus communication mode. In the interaction process, the signal transmission generates a certain time difference. In this embodiment, the host and the slave calculate the deviation by using the recorded sent/received time points as a reference, so that to make supplements to ensure phase synchronization. Specifically, the host sends a first frame of a synchronization signal to the slave when a power frequency cycle crosses zero, triggers an interruption of the CAN bus when the sending of the first frame is completed and records a value T1 of a first counter at this time in the interruption of the CAN bus. Moreover, the host records a value M1 of a second counter, a phase value W1, and a value T2 of the first counter at a time when the sending of the first frame is completed. Based on M1, W1, and T2, the host determines the phase value W2 at T1 and the adjustment step size ΔM of the second counter. Then the host sends the phase value W2 at T1 and the adjustment step size ΔM of the second counter as a second frame of the synchronization signal to the slave.

The first counter, configured to record the time point of the host, may be a Timer counter. The second counter is configured as a carrier counter of the host.

In this embodiment, the phase step size to be supplemented is determined by using the sent/received time points recorded by the host and the slave and calculating the time difference. Then the phase step size is sent to the slave. In this manner, the phase synchronization of the host and the slave is quickly achieved.

Figure 6:
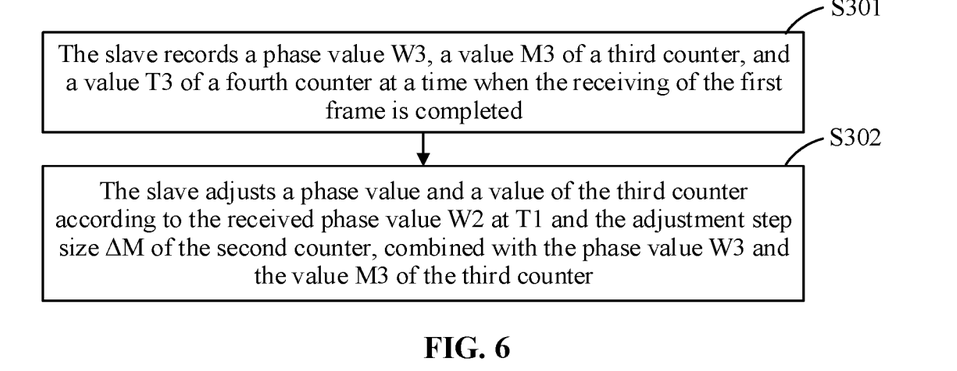
FIG. 6 is another flowchart of an embodiment of a method for seamless switching between off-grid and grid-connected according to the present application.

In some optional implementations of this embodiment, the host phase-locks the phase and frequency of the utility power. The host communicates with the slave via CAN bus. As shown in FIG. 6, the steps included are described below.

S301: The slave records a phase value W3, a value M3 of a third counter, and a value T3 of a fourth counter at a time when the receiving of the first frame is completed.

S302: The slave adjusts a phase value and a value of the third counter according to the received phase value W2 at T1 and the adjustment step size ΔM of the second counter, combined with the phase value W3 and the value M3 of the third counter.

Specifically, after receiving the first frame of the synchronization signal, the slave records its own phase value W3, a value M3 of a third counter, and a value T3 of a fourth counter. Moreover, the slave adjusts the phase value and the value of the third counter according to the received phase value W2 at T1 and the adjustment step size ΔM of the second counter and performs differential compensation, thereby achieving phase synchronization of the host and slave.

The third counter is configured as a carrier counter of the slave. The fourth counter is configured to record the time point of the slave.

In this embodiment, the slave quickly performs differential compensation by the value recorded by itself and the received value, thereby helping improve the efficiency of phase synchronization.

Figure 7:
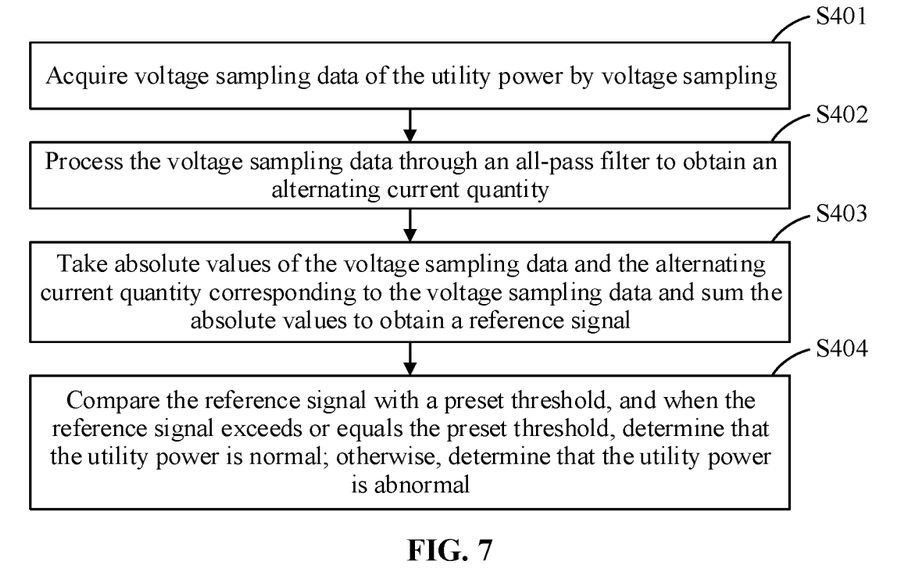
FIG. 7 is another flowchart of an embodiment of a method for seamless switching between off-grid and grid-connected according to the present application.

In some optional implementations of this embodiment, the host determines whether the utility power is abnormal by the detection of the voltage of the utility power. As shown in FIG. 7, specifically, the steps included are described below.

S401: Voltage sampling data of the utility power is acquired by voltage sampling.

S402: The voltage sampling data is processed through an all-pass filter to obtain an alternating current quantity.

S403: Absolute values are taken for the voltage sampling data and the alternating current quantity corresponding to the voltage sampling data and the absolute values are summed to obtain a reference signal.

S404: The reference signal is compared with a preset threshold, and when the reference signal exceeds or equals the preset threshold, it is determined that the utility power is normal; otherwise, it is determined that the utility power is abnormal.

The all-pass filter (APF) does not change the frequency characteristics of the input signal, but changes the phase of the input signal. With this feature, the all-pass filter can be used as a delayer, delay equalizer, and so on.

Specifically, in this embodiment, the voltage sampling data is acquired by sampling the voltage in the utility power. Then the voltage sampling data is filtered by using an all-pass filter to obtain an alternating current quantity with a certain delay. Meanwhile, absolute values are separately taken for the voltage sampling data and the alternating current quantity corresponding to the voltage sampling data and then the absolute values are summed to obtain a reference signal. Afterwards, the reference signal is compared with the preset threshold, and the utility power state is determined according to the comparison result. When the reference signal exceeds or equals the preset threshold, it is determined that the utility power is normal; otherwise, it is determined that the utility power is abnormal.

Optionally, the voltage sampling data is processed by the all-pass filter with a phase lag of 90°, and the reference signal is 4 times a power frequency signal.

It should be noted that determining whether the utility power is abnormal by the voltage is a specific embodiment adopted in this embodiment, but the method is not limited to this in practice. In practical applications, determining whether the utility power is abnormal may be based on the frequency or other parameters, which is not specifically limited herein.

Optionally, after the input switch is turned off, and off-grid drive of the slave is delayed for 1.5 ms, the off-grid working mode is entered.

Optionally, after the input switch is closed for 1.5 ms, grid-connected drive is started, and the grid-connected working mode is entered.

It should be understood that the sequence numbers of the steps in the preceding embodiments do not mean the execution order, and the execution order of the preceding processes should be determined according to their functions and internal logic, which should not limit the implementation processes of the present application in any improper way.

Figure 8:
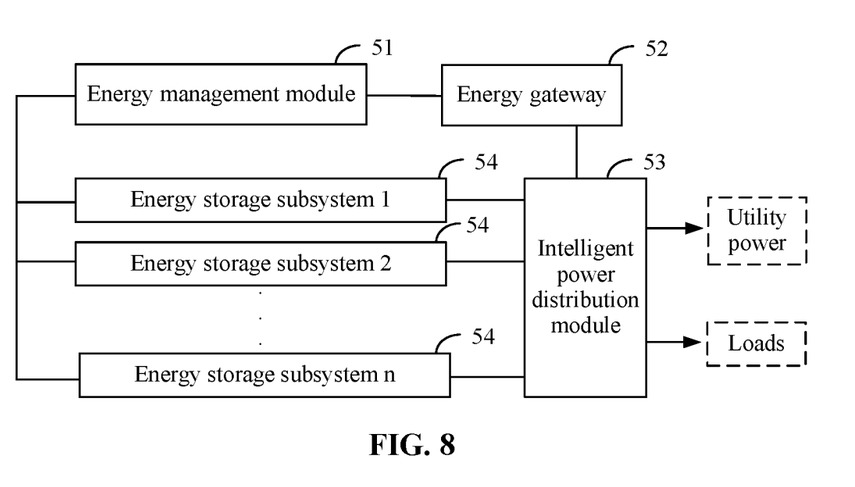
FIG. 8 is an architectural diagram where the present application can be configured to be the exemplary household energy storage system.

FIG. 8 shows a household energy storage system according to an embodiment of the present application. With reference to FIG. 8, the household energy storage system is configured to achieve the method for seamless switching between off-grid and grid-connected as shown in FIG. 1. The household energy storage system includes an energy management module 51, an energy gateway 52, an intelligent power distribution module 53, and at least one energy storage subsystem 54.

Figure 9:
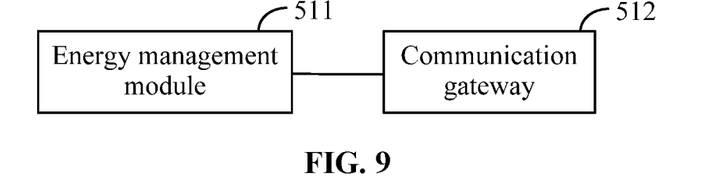
FIG. 9 is a diagram of an energy management module of an embodiment of the household energy storage system according to the present application.

FIG. 9 is a diagram of an energy management module of the household energy storage system according to an embodiment of the present application. With reference to FIG. 9, the energy management module 51 includes an energy management unit 511 and a communication gateway 512. The energy management unit is configured to control charging and discharging of the energy storage subsystem. The communication gateway 512 is configured to detect an operating state of the entire household energy storage system and communicate with an Internet of Things cloud platform.

The energy gateway 52 is configured to cut off a connection between the utility power and the household energy storage system when the utility power fails and is configured to resume the connection between the utility power and the household energy storage system when the utility power is restored.

The intelligent power distribution module 53 is configured to control on-off of the energy storage subsystem and control an access of loads and an access of power supply equipment.

The energy storage subsystem 54 includes a battery management module 541, an energy storage battery module 542, and at least one power converter 543. The battery management module 541 is configured to manage charging and discharging of the energy storage battery module 542 and acquire a signal of the energy storage battery module 542. The power converter 543 is configured to convert an alternating current into a direct current rechargeable for the energy storage battery module 542, and when the energy storage battery module 542 discharges, the power converter 543 is configured to a convert direct current into an alternating current usable by grid-connected and home loads.

In a grid-connected state, when the energy management module 51 determines that utility power is abnormal, a grid-connected working mode is closed. A phase-locked source of the energy management module 51 is switched from the utility power to a self-oscillation state. The energy management module 51 notifies the power converter to switch a phase-locked source and sends a phase-locked result to the power converter 543. The phase-locked source of the power converter 543 is switched to the self-oscillation state of the energy management module 51, and phase-locking is performed. An input switch of the utility power is turned off when the phase-locking of the power converter 543 ends. An off-grid working mode is started after the input switch is turned off.

In an off-grid state, when the energy management module 51 determines that the utility power is normal, the phase-locked source of the energy management module 51 is switched from the self-oscillation state to the utility power. The energy management module 51 notifies the power converter 543 to switch a phase-locked source and sends a phase-locked result to the power converter 543. The phase-locked source of the power converter 543 is switched to the utility power, and phase-locking is performed. The input switch of the utility power is turned on after the phase-locking of the power converter 543 ends. The off-grid working mode is closed before the input switch is turned on, and the grid-connected working mode is started after the input switch is turned on.

The household energy storage system is configured such that the energy management module 51 phases-locks the phase and frequency of the utility power. The energy management module 51 communicates with the power converter 543 via the CAN bus, and the specific implementation includes the steps described below.

The energy management module 51 sends a first frame of a synchronization signal to the power converter 543 when a power frequency cycle crosses zero.

The energy management module 51 triggers an interruption of the CAN bus when a sending of the first frame is completed and records a value T1 of a first counter at this time in the interruption of the CAN bus.

The energy management module 51 records a phase value W1, a value M1 of a second counter, and a value T2 of the first counter at a time when the sending of the first frame is completed.

The energy management module 51 calculates a phase value W2 at T1 and an adjustment step size ΔM of the second counter according to a difference between T1 and T2.

The energy management module 51 sends the phase value W2 at T1 and the adjustment step size ΔM of the second counter as a second frame of the synchronization signal to the power converter 543.

The household energy storage system is configured such that the energy management module 51 phases-locks the phase and frequency of the utility power. The energy management module 51 communicates with the power converter 543 via the CAN bus, and the specific implementation also includes the steps described below.

The power converter 543 records a phase value W3, a value M3 of a third counter, and a value T3 of a fourth counter at this time when the receiving of the first frame of the synchronization signal is completed.

The power converter 543 adjusts a phase value and a value of the third counter according to the received phase value W2 at T1 and the adjustment step size ΔM of the second counter, combined with the phase value W3 and the value M3 of the third counter.

When the household energy storage system is configured such that the energy management module 51 determines whether the utility power is abnormal by detection of the voltage of the utility power, a specific configuration is described below.

Voltage sampling data of the power utility is acquired by voltage sampling.

The voltage sampling data is processed through an all-pass filter to obtain an alternating current quantity.

Absolute values are taken for the voltage sampling data and the alternating current quantity corresponding to the voltage sampling data and the absolute values are summed to obtain a reference signal.

The reference signal is compared with a preset threshold, and when the reference signal exceeds or equals the preset threshold, it is determined that the utility power is normal; otherwise, it is determined that the utility power is abnormal.

Optionally, the energy gateway 52 is configured to cut off the connection of the power supply equipment and the household loads to the power grid when the grid-connected is switched to the off-grid. And the energy gateway 52 is configured to resume the connection of the energy storage subsystem and the household loads to the utility power when the off-grid is switched to the grid-connected.

Optionally, working modes of the energy management module 51 include a backup mode, a photovoltaic self-power mode, and a peak cut mode.

Figure 10:
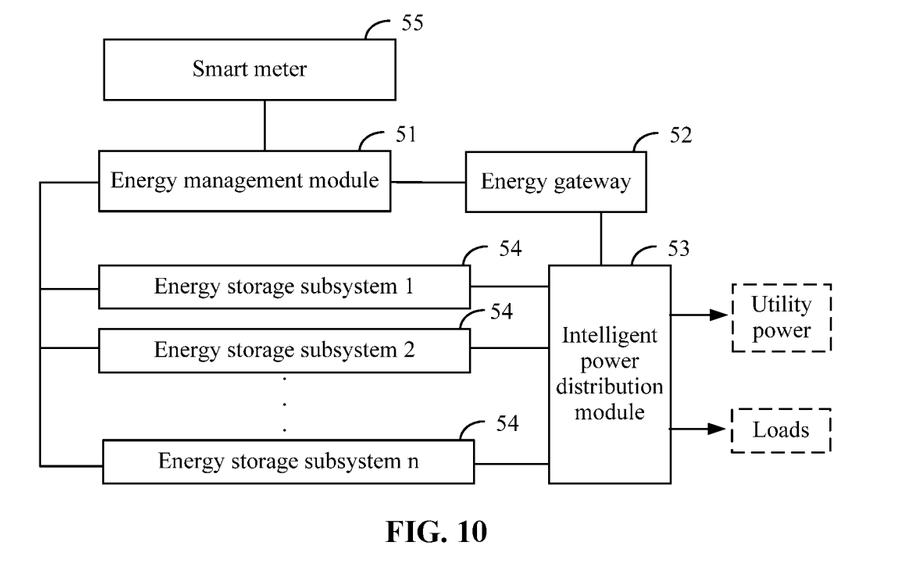
FIG. 10 is another exemplary system architecture diagram of the household energy storage system according to the present application.

Optionally, as shown in FIG. 10, the household energy storage system also includes a smart meter 55 communicatively connected to the energy management module 51. The smart meter 55 is configured to measure the power and electric energy of the household grid-side and the power supply equipment and send the measured data to the energy management module through the communication connection.

Figure 11:
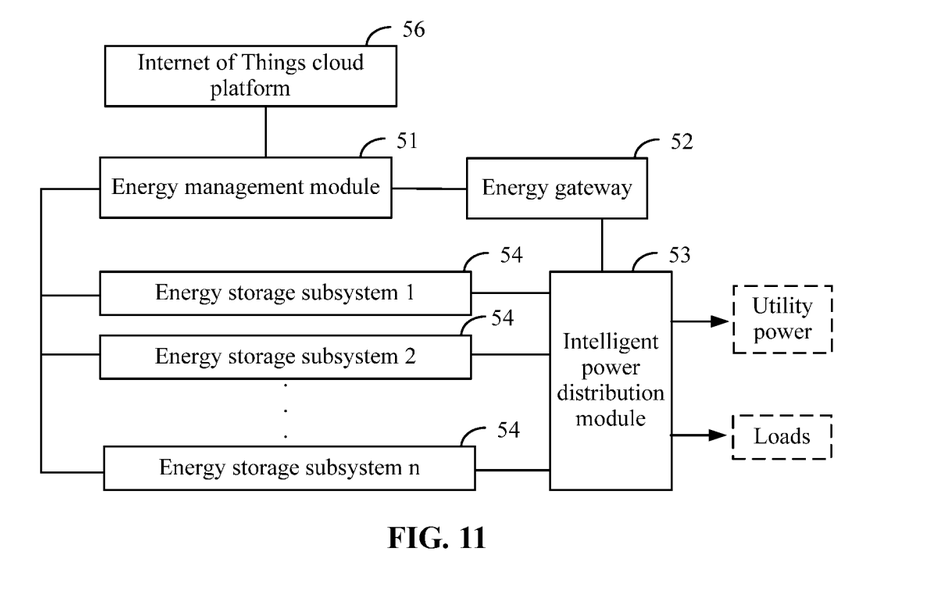
FIG. 11 is another exemplary system architecture diagram of the household energy storage system according to the present application.

Optionally, as shown in FIG. 11, the household energy storage system also includes an Internet of Things cloud platform 56 configured to be communicatively connected to the energy management module 51 to receive measured data uploaded by the energy management module 51. Moreover, Internet of Things cloud platform 56 sends control instructions to the energy management module 51 through wireless communication.

Figure 12:
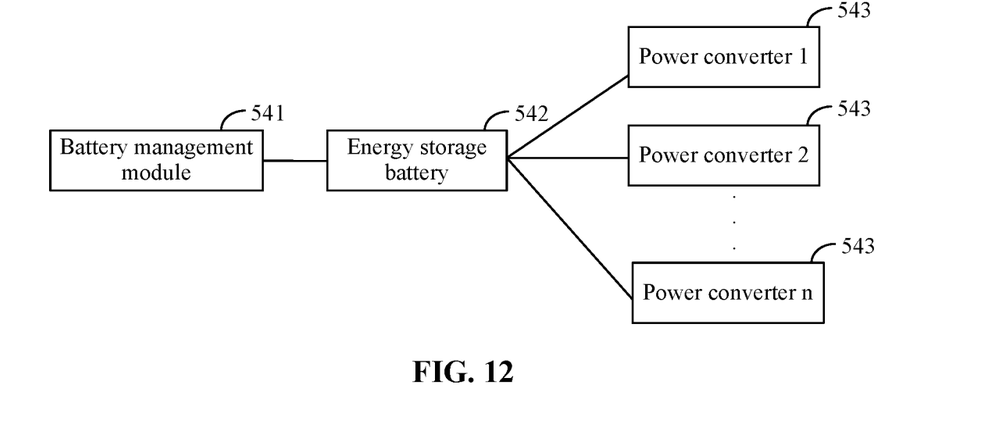
FIG. 12 is a diagram of an energy storage subsystem of an embodiment of the household energy storage system according to the present application.

Further, each storage system includes multiple energy storage subsystems 54, as shown in FIG. 12. FIG. 12 is a diagram of an energy storage subsystem according to an embodiment of the present application. The energy storage subsystem 54 includes a battery management module 541, an energy storage battery module 542, and one or more power converter 543. The one or more power converter may specifically be an AC/DC, a DC/AC, or the like. The energy storage subsystems 54 are configured to be connected in parallel and assigned a communication address through the energy management module 51.

Apparently, the embodiments described above are part, not all, of the embodiments of the present application. The preferred embodiments of the application are given in the accompanying drawings, but the patent scope of the application is not limited herein. The present application may be implemented in many different forms. Conversely, these embodiments are provided for a more thorough and comprehensive understanding of the content disclosed by the present application. Although the present application is described in detail with reference to the preceding embodiments, those skilled in the art can still modify the technical solutions described in the preceding embodiments, or make equivalent substitutions on part of the technical features therein. Direct or indirect utilization of the specification and accompanying drawings of the present application in equivalent structural variations or in the related art is within the scope of the present application.

What is claimed is:

1. A method for seamless switching between off-grid and grid-connected, which is applied to a household energy storage system, comprising:

in a grid-connected state, when a host determines that utility power is abnormal, closing a grid-connected working mode; switching a phase-locked source of the host from the utility power to a self-oscillation state; notifying, by the host, a slave to switch a phase-locked source and sending a phase-locked result to the slave; switching the phase-locked source of the slave to the self-oscillation state of the host, and performing phase-locking; turning off an input switch of the utility power when the phase-locking of the slave ends; and starting an off-grid working mode after the input switch is turned off; and in an off-grid state, when the host determines that the utility power is normal, switching the phase-locked source of the host from the self-oscillation state to the utility power; notifying, by the host, the slave to switch a phase-locked source and sending a phase-locked result to the slave; switching the phase-locked source of the slave to the utility power, and performing phase-locking; turning on the input switch of the utility power after the phase-locking of the slave ends; and closing the off-grid working mode before the input switch is turned on, and starting the grid-connected working mode after the input switch is turned on, wherein the host determines whether the power utility is abnormal by a detection of voltage of the power utility that comprises: acquiring voltage sampling data of the power utility by voltage sampling; processing the voltage sampling data through an all-pass filter to obtain an alternating current quantity; taking absolute values of the voltage sampling data and the alternating current quantity corresponding to the voltage sampling data, and summing the absolute values to obtain a reference signal; and comparing the reference signal with a preset threshold, when the reference signal exceeds or equals the preset threshold, determining that the utility power is normal; otherwise, determining that the utility power is abnormal.

2. The method for seamless switching between off-grid and grid-connected according to claim 1, wherein the host phase-locks phase and frequency of the utility power, and the host communicates with the slave via CAN bus.

3. The method for seamless switching between off-grid and grid-connected according to claim 2, wherein the host sends a first frame of a synchronization signal to the slave when a power frequency cycle crosses zero;

the host triggers an interruption of the CAN bus when sending of the first frame is completed and records a value T1 of a first counter at a time in the interruption of the CAN bus;

the host records a phase value W1, a value M1 of a second counter, and a value T2 of the first counter at a time that when sending of the first frame is completed;

the host calculates a phase value W2 at T1 and an adjustment step size ΔM of the second counter according to a difference between T1 and T2; and the host sends the phase value W2 at T1 and the adjustment step size ΔM of the second counter as a second frame of the synchronization signal to the slave.

4. The method for seamless switching between off-grid and grid-connected according to claim 3, the slave records a phase value W3, a value M3 of a third counter, and a value T3 of a fourth counter at a time when the receiving of the first frame is completed; and the slave adjusts a phase value and a value of the third counter according to the received phase value W2 at T1 and the adjustment step size ΔM of the second counter, combined with the phase value W3 and the value M3 of the third counter.

5. The method for seamless switching between off-grid and grid-connected according to claim 1, wherein the voltage sampling data is processed by the all-pass filter with a phase lag of 90°, and the reference signal is 4 times a power frequency signal.

6. The method for seamless switching between off-grid and grid-connected according to claim 1, wherein after the input switch is turned off and off-grid drive of the slave is delayed for 1.5 ms, the off-grid working mode is entered.

7. The method for seamless switching between off-grid and grid-connected according to claim 1, wherein after the input switch is closed for 1.5 ms, grid-connected drive is started, and the grid-connected working mode is entered.

8. A household energy storage system, comprising an energy management module, an energy gateway, an intelligent power distribution module, and at least one energy storage subsystem, wherein the energy management module comprises an energy management unit and a communication gateway, wherein the energy management unit is configured to control charging and discharging of the energy storage subsystem, and the communication gateway is configured to detect an operating state of the entire household energy storage system and communicate with an Internet of Things cloud platform;

wherein the energy gateway is configured to cut off a connection between utility power and the household energy storage system when the utility power fails and is configured to resume the connection between the utility power and the household energy storage system when the utility power is restored;

wherein the intelligent power distribution module is configured to control on-off of the energy storage subsystem and control an access of loads and an access of power supply equipment;

wherein the energy storage subsystem comprises a battery management module, an energy storage battery module, and at least one power converter, wherein the battery management module is configured to manage charging and discharging of the energy storage battery module and acquire a signal of the energy storage battery module, the power converter is configured to convert an alternating current into a direct current rechargeable for the energy storage battery module, and when the energy storage battery module discharges, the power converter is configured to convert a direct current into an alternating current usable by grid-connected and home loads;

wherein in a grid-connected state, when the energy management module determines that utility power is abnormal, a grid-connected working mode is closed; a phase-locked source of the energy management module is switched from the utility power to a self-oscillation state; the energy management module notifies the power converter to switch a phase-locked source and sends a phase-locked result to the power converter; the phase-locked source of the power converter is switched to the self-oscillation state of the energy management module, and phase-locking is performed; an input switch of the utility power is turned off when the phase-locking of the power converter ends; and an off-grid working mode is started after the input switch is turned off; and wherein in an off-grid state, when the energy management module determines that the utility power is normal, the phase-locked source of the energy management module is switched from the self-oscillation state to the utility power; the energy management module notifies the power converter to switch a phase-locked source and sends a phase-locked result to the power converter; the phase-locked source of the power converter is switched to the utility power, and phase-locking is performed; the input switch of the utility power is turned on after the phase-locking of the power converter ends; and the off-grid working mode is closed before the input switch is turned on, and the grid-connected working mode is started after the input switch is turned on, wherein the energy management module is further configured to detect voltage of the utility power to determine whether the utility power is abnormal, and is further configured to: acquire voltage sampling data of the power utility by voltage sampling; process the voltage sampling data through an all-pass filter to obtain an alternating current quantity; take absolute values of the voltage sampling data and the alternating current quantity corresponding to the voltage sampling data and sum the absolute values to obtain a reference signal; compare the reference signal with a preset threshold and determine whether the utility power is abnormal, and when the reference signal exceeds or equals the preset threshold, determine that the utility power is normal; otherwise, determine that the utility power is abnormal.

9. The household energy storage system according to claim 8, wherein the energy management module is further configured to:
send a first frame of a synchronization signal to the power converter when a power frequency cycle crosses zero;
trigger an interruption of the CAN bus when sending of the first frame is completed and record a value T1 of a first counter at a time in the interruption of the CAN bus;
record a phase value W1, a value M1 of a second counter, and a value T2 of the first counter at a time when the sending of the first frame is completed;
calculate a phase value W2 at T1 and an adjustment step size ΔM of the second counter according to a difference between T1 and T2;
send the phase value W2 at T1 and the adjustment step size ΔM of the second counter as a second frame of the synchronization signal to the power converter.

10. The household energy storage system according to claim 9, wherein the power converter is further configured to:
receive the first frame of the synchronization signal;
record a phase value W3, a value M3 of a third counter, and a value T3 of a fourth counter at a time when the receiving of the first frame of the synchronization signal is completed;
adjust a phase value and a value of the third counter according to the received phase value W2 at T1 and the adjustment step size ΔM of the second counter, combined with the phase value W3 and the value M3 of the third counter.

11. The household energy storage system according to claim 10, wherein the voltage sampling data is processed by the all-pass filter with a phase lag of 90°, and the reference signal is 4 times a power frequency signal.

12. The household energy storage system according to claim 8, wherein working modes of the energy gateway include a backup mode, a photovoltaic self-power mode, and a peak cut mode.

13. The household energy storage system according to claim 8, wherein the household energy storage system further includes a smart meter communicatively connected to the energy management module, and wherein the smart meter is configured to:
measure a power and electric energy of a household grid-side and a power supply equipment; and,
send measured data to the energy management module through a communication connection.

14. The household energy storage system according to claim 13, wherein the Internet of Things cloud platform is configured to:
communicatively connect to the energy management module to receive measured data uploaded by the energy management module; and,
send control instructions to the energy management module through wireless communication.

15. The household energy storage system according to claim 8, wherein the at least one energy storage subsystem is configured to be connected in parallel and assigned a communication address by the energy management module.

16. The household energy storage system according to claim 8, wherein the energy management module is configured to communicate with the power converter via the CAN bus.

17. A method for seamless switching between off-grid and grid-connected, which is applied to a household energy storage system, comprising:
in a grid-connected state, when a host determines that utility power is abnormal, closing a grid-connected working mode; switching a phase-locked source of the host from the utility power to a self-oscillation state; notifying, by the host, a slave to switch a phase-locked source and sending a phase-locked result to the slave; switching the phase-locked source of the slave to the self-oscillation state of the host, and performing phase-locking; turning off an input switch of the utility power when the phase-locking of the slave ends; and starting an off-grid working mode after the input switch is turned off; and
in an off-grid state, when the host determines that the utility power is normal, switching the phase-locked source of the host from the self-oscillation state to the utility power; notifying, by the host, the slave to switch a phase-locked source and sending a phase-locked result to the slave; switching the phase-locked source of the slave to the utility power, and performing phase-locking; turning on the input switch of the utility power after the phase-locking of the slave ends; and closing the off-grid working mode before the input switch is turned on, and starting the grid-connected working mode after the input switch is turned on, wherein the method further comprises one of following:
after the input switch is turned off and off-grid drive of the slave is delayed for 1.5 ms, the off-grid working mode is entered; or
after the input switch is closed for 1.5 ms, grid-connected drive is started, and the grid-connected working mode is entered.

* * * * *